(12) United States Patent
Matsui

(10) Patent No.: US 10,963,516 B2
(45) Date of Patent: Mar. 30, 2021

(54) ELECTRONIC DEVICE HAVING USER SEARCHABLE SETTINGS ITEMS, SEARCH METHOD FOR OBTAINING SETTING ITEMS, AND COMPUTER PROGRAM PRODUCT THEREFOR

(71) Applicant: Tomomi Matsui, Kanagawa (JP)

(72) Inventor: Tomomi Matsui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 114 days.

(21) Appl. No.: 16/299,577

(22) Filed: Mar. 12, 2019

(65) Prior Publication Data
US 2019/0286665 A1 Sep. 19, 2019

(30) Foreign Application Priority Data
Mar. 19, 2018 (JP) .............................. JP2018-051812

(51) Int. Cl.
*G06F 16/9032* (2019.01)
*G06F 3/12* (2006.01)
(Continued)

(52) U.S. Cl.
CPC ...... *G06F 16/90332* (2019.01); *G06F 3/1204* (2013.01); *G06F 3/1258* (2013.01); *G06F 40/242* (2020.01); *G06F 40/247* (2020.01)

(58) Field of Classification Search
CPC ............. G06F 3/1204; G06F 16/90332; G06F 40/242; G06F 40/247; G06F 3/1258
See application file for complete search history.

(56) References Cited

U.S. PATENT DOCUMENTS

2006/0253427 A1* 11/2006 Wu ..................... G06F 16/3322
707/999.003
2008/0034081 A1* 2/2008 Marshall ................ G05B 19/02
709/223
(Continued)

FOREIGN PATENT DOCUMENTS

| JP | 2009-093312 | 4/2009 |
|----|-------------|--------|
| JP | 2011-257786 | 12/2011 |
| JP | 5708569 | 3/2015 |

OTHER PUBLICATIONS

Wong, Alfred Ka Yiu, et al., "Ontology Mapping for the Interoperability Problem in Network Management", IEEE Journal on Selected Areas in Communications, vol. 23, No. 10, Oct. 2005, pp. 2058-2068. (Year: 2005).*

(Continued)

*Primary Examiner* — Scott A. Waldron
(74) *Attorney, Agent, or Firm* — Harness, Dickey & Pierce, P.L.C.

(57) ABSTRACT

An electronic device includes a processor configured to perform: obtaining identification information of another electronic device; receiving an entered keyword that is a keyword entered by the user; searching including conducting a search to identify a standard keyword that is a keyword contained in an item name of a setting item of the other electronic device corresponding to the identification information, based on the keyword and first dictionary information related to the other electronic device, and conducting a search to identify a standard keyword of the electronic device based on the identified standard keyword of the other electronic device and a second dictionary information related to the electronic device; and presenting the user with a setting item of the electronic device containing the standard keyword of the electronic device identified at the searching.

19 Claims, 8 Drawing Sheets

SECOND DICTIONARY INFORMATION

| MULTIFUNCTION PERIPHERAL B STANDARD WORD | RELATING WORD 1 | RELATING WORD 2 | RELATING WORD 3 | MULTIFUNCTION PERIPHERAL A | MULTIFUNCTION PERIPHERAL C | ... |
|---|---|---|---|---|---|---|
| FACSIMILE | FAXING | FAX | - | FACSIMILE | INDIRECT TRANSMISSION | ... |
| STAPLES | STAPLING | STAPLE | STAPLER | BINDING | STAPLES | ... |
| ... | ... | ... | ... | ... | ... | ... |

(51) Int. Cl.
*G06F 40/242* (2020.01)
*G06F 40/247* (2020.01)

(56) References Cited

U.S. PATENT DOCUMENTS

| | | | |
|---|---|---|---|
| 2013/0339002 A1 | 12/2013 | Wakui et al. | |
| 2014/0207776 A1* | 7/2014 | Harris | G06N 5/022 707/737 |
| 2016/0078016 A1* | 3/2016 | Ng Tari | G06F 40/284 707/723 |

OTHER PUBLICATIONS

Ngoupe, Eric Lunauid, et al., "A Data Model for Management of Network Device Configuration Heterogeneity", 2015 IFIP/IEEE International Symposium on Integrated Network Management (IM), Jul. 2015, pp. 1230-1233. (Year: 2015).*

"Study on Semantic Assets for Smart Appliances Interoperability", D-S4 Final Report for the European Commission DG Communications Networks, Content & Technology, 164 pages. (Year: 2015).*

* cited by examiner

FIG.5

| FACSIMILE INITIAL SETTINGS | | | EXIT | |
|---|---|---|---|---|
| BASIC SETTINGS | READING SETTINGS | TRANSMISSION SETTINGS | RECEPTION SETTINGS | INTRODUCTION SETTINGS |

| QUICK OPERATION KEY 1 | NONE | PRINT F-CODE BOX SETTING LIST | |
|---|---|---|---|
| QUICK OPERATION KEY 2 | DISPLAY TRANSMISSION RESULT | ON-HOOK CANCELLATION PERIOD | 3 MINUTES |
| QUICK OPERATION KEY 3 | DISPLAY RECEPTION RESULT | DELETE ADDRESS HISTORY | |
| ADDRESS LIST HEADER OPTION | HEADER 1 | AUTOMATICALLY PRINT COMMUNICATION MANAGEMENT REPORTS | YES |
| SENT/RECEIVED SHEETS COUNTER | | RINGER TONE | MUTED |
| ADJUST SOUND VOLUME | | | |
| F-CODE BOX SETTING | | | |

FIG.6

FIRST DICTIONARY INFORMATION

| MULTIFUNCTION PERIPHERAL A | | | |
|---|---|---|---|
| STANDARD WORD | RELATING WORD 1 | RELATING WORD 2 | ... |
| FACSIMILE | FAXING | FAX | ... |
| BINDING | FASTENING | - | ... |
| ... | ... | ... | ... |

FIG.7

THIRD DICTIONARY INFORMATION

| MULTIFUNCTION PERIPHERAL B | | | | |
|---|---|---|---|---|
| STANDARD WORD | RELATING WORD 1 | RELATING WORD 2 | RELATING WORD 3 | ... |
| FACSIMILE | FAXING | FAX | - | ... |
| STAPLES | STAPLING | STAPLE | STAPLER | ... |
| ... | ... | ... | ... | ... |

FIG.8

SECOND DICTIONARY INFORMATION

| MULTIFUNCTION PERIPHERAL B | STANDARD WORD | RELATING WORD 1 | RELATING WORD 2 | RELATING WORD 3 | MULTIFUNCTION PERIPHERAL A | MULTIFUNCTION PERIPHERAL C |
|---|---|---|---|---|---|---|
| | FACSIMILE | FAXING | FAX | - | FACSIMILE | INDIRECT TRANSMISSION |
| | STAPLES | STAPLING | STAPLE | STAPLER | BINDING | STAPLES |
| | ⋮ | ⋮ | ⋮ | ⋮ | ⋮ | ⋮ |

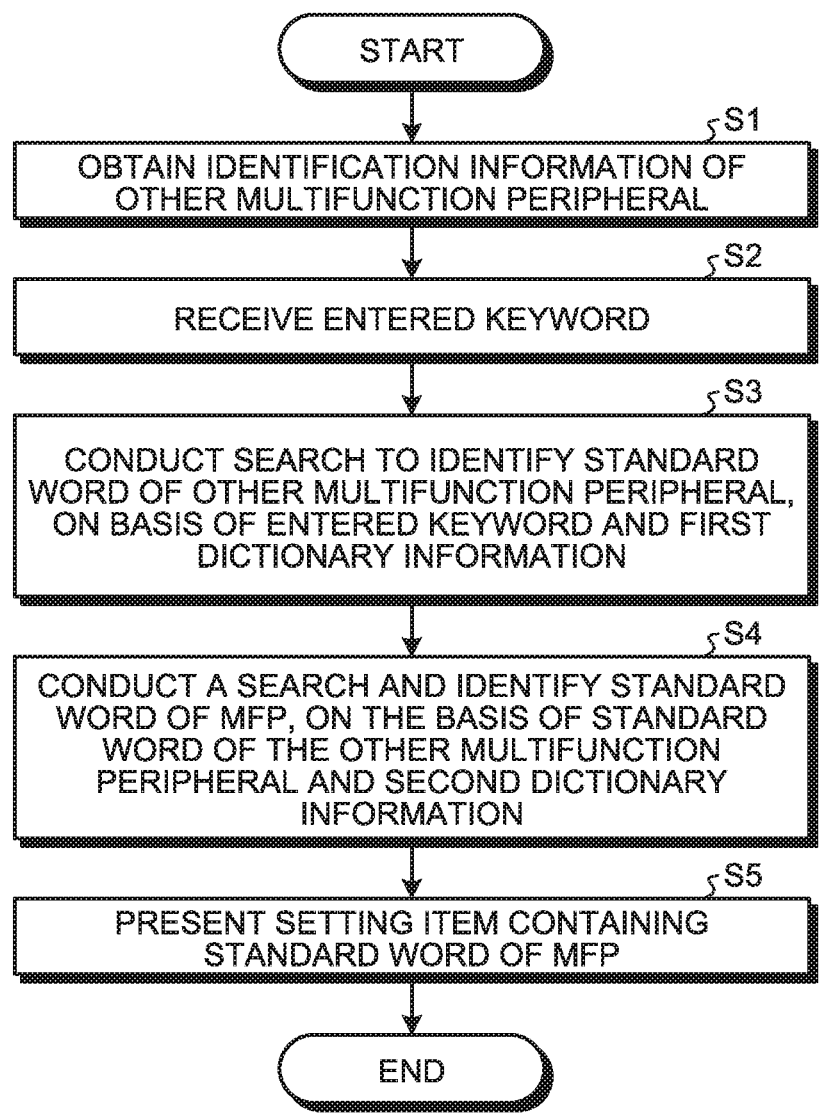

ELECTRONIC DEVICE HAVING USER SEARCHABLE SETTINGS ITEMS, SEARCH METHOD FOR OBTAINING SETTING ITEMS, AND COMPUTER PROGRAM PRODUCT THEREFOR

CROSS-REFERENCE TO RELATED APPLICATIONS

The present application claims priority under 35 U.S.C. § 119 to Japanese Patent Application No. 2018-051812, filed on Mar. 19, 2018. The contents of which are incorporated herein by reference in their entirety.

BACKGROUND OF THE INVENTION

1. Field of the Invention

The present disclosure is related to an electronic device, a search method, and a computer program product.

2. Description of the Related Art

Conventionally, when configuring a setting into an electronic device (e.g., a multifunction peripheral), a user needs, at first, to arrange a desired one of a plurality of setting items to be displayed on a screen. A technique is known by which, to enable the user to arrange the desired setting item to be displayed on the screen in a short period of time in that situation, the user is prompted to enter a keyword so that, by using the entered keyword, a search is conducted in dictionary data in which a standard word contained in the item name of a setting item and a plurality of keywords are associated with one another and so that the setting item containing the searched standard word is displayed on the screen.

In that situation, by entering the keyword (a synonym) registered in the dictionary data, the user is able to arrange the desired setting item to be displayed on the screen, without the need to enter a keyword that completely matches the standard word. This function is generally called an ambiguous search. For example, among various types of multifunction peripherals, mutually-different standard words (e.g., facsimile, faxing, and fax) may be used for the same setting item. For this reason, it is effective to enable ambiguous searches when an electronic device is replaced with another type of electronic device.

However, for example, when an ambiguous search using the conventional method is conducted on an electronic device that is available in a large number of types, there is a possibility that responsiveness may be lowered due to an extremely huge amount of dictionary data or that the search may not find the desired setting item because one keyword is associated with a plurality of setting items. Accordingly, there is room for improvement in terms of convenience.

SUMMARY OF THE INVENTION

According to one aspect of the present invention, an electronic device has a plurality of setting items to be configured by a user. The electronic device includes a processor configured to perform: referring to first dictionary information that is related to another electronic device different from the electronic device and in which a standard keyword that is a keyword contained in an item name of a setting item of the other electronic device and one or more keywords are associated with one another, and second dictionary information that is related to the electronic device and in which a standard keyword of the electronic device, one or more keywords, and the standard keyword of the other electronic device are associated with one another; obtaining identification information of the other electronic device; receiving an entered keyword that is a keyword entered by the user; searching including conducting a search to identify the standard keyword of the other electronic device based on the entered keyword and the first dictionary information related to the other electronic device corresponding to the identification information obtained at the obtaining, and conducting a search to identify the standard keyword of the electronic device based on the identified standard keyword of the other electronic device and the second dictionary information; and presenting the user with a setting item of the electronic device, the setting item containing the standard keyword of the electronic device identified at the searching.

BRIEF DESCRIPTION OF THE DRAWINGS

FIG. 5 is a drawing illustrating an example of a setting screen according to the present embodiment;

FIG. 6 is a drawing illustrating first dictionary information according to the present embodiment;

FIG. 7 is a drawing illustrating third dictionary information according to the present embodiment;

FIG. 8 is a drawing illustrating second dictionary information according to the present embodiment;

FIG. 11 is a flowchart illustrating processes including a setting item searching process performed by the MFP according to the present embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
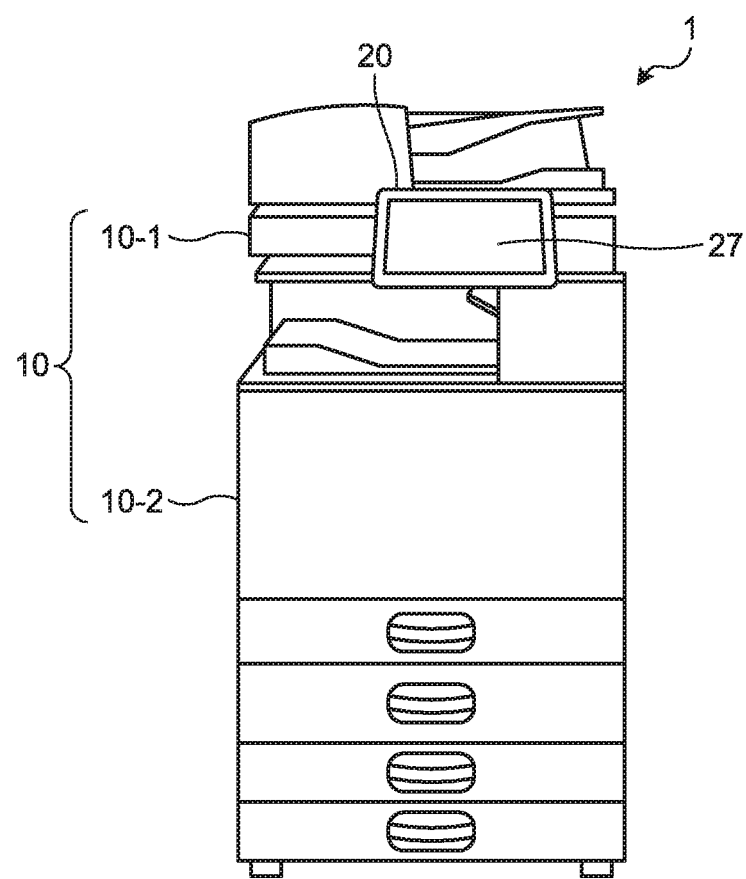
FIG. 1 is a configuration diagram illustrating an external appearance of a Multifunction Peripheral (MFP) according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an electronic device, a search method, and a computer program product capable of improving convenience in relation to ambiguous searches.

Exemplary embodiments of an electronic device, a search method, and a computer program of the present disclosure will be explained in detail below, with reference to the accompanying drawings.

FIG. 1 is configuration diagram illustrating an external appearance of a Multifunction Peripheral (MFP) 1 according to an embodiment. The MFP 1 is an example of the electronic device. The MFP 1 has at least two functions selected from among various types of functions such as a copy function, a scanner function, a facsimile function, a printer function, and the like.

The MFP 1 illustrated in FIG. 1 includes a main body 10 and an operational device 20. The main body 10 includes a scanner unit 10-1 that scans an original document and an image forming unit 10-2 that forms an image on a recording medium such as paper. The main body 10 provides services such as copying, scanning, and/or the like.

The operational device 20 includes an operation panel 27 and receives an operation from a user. The operational device 20 has pre-installed therein various types of applications that allow a user to use the services offered by the main body 10.

Figure 2:
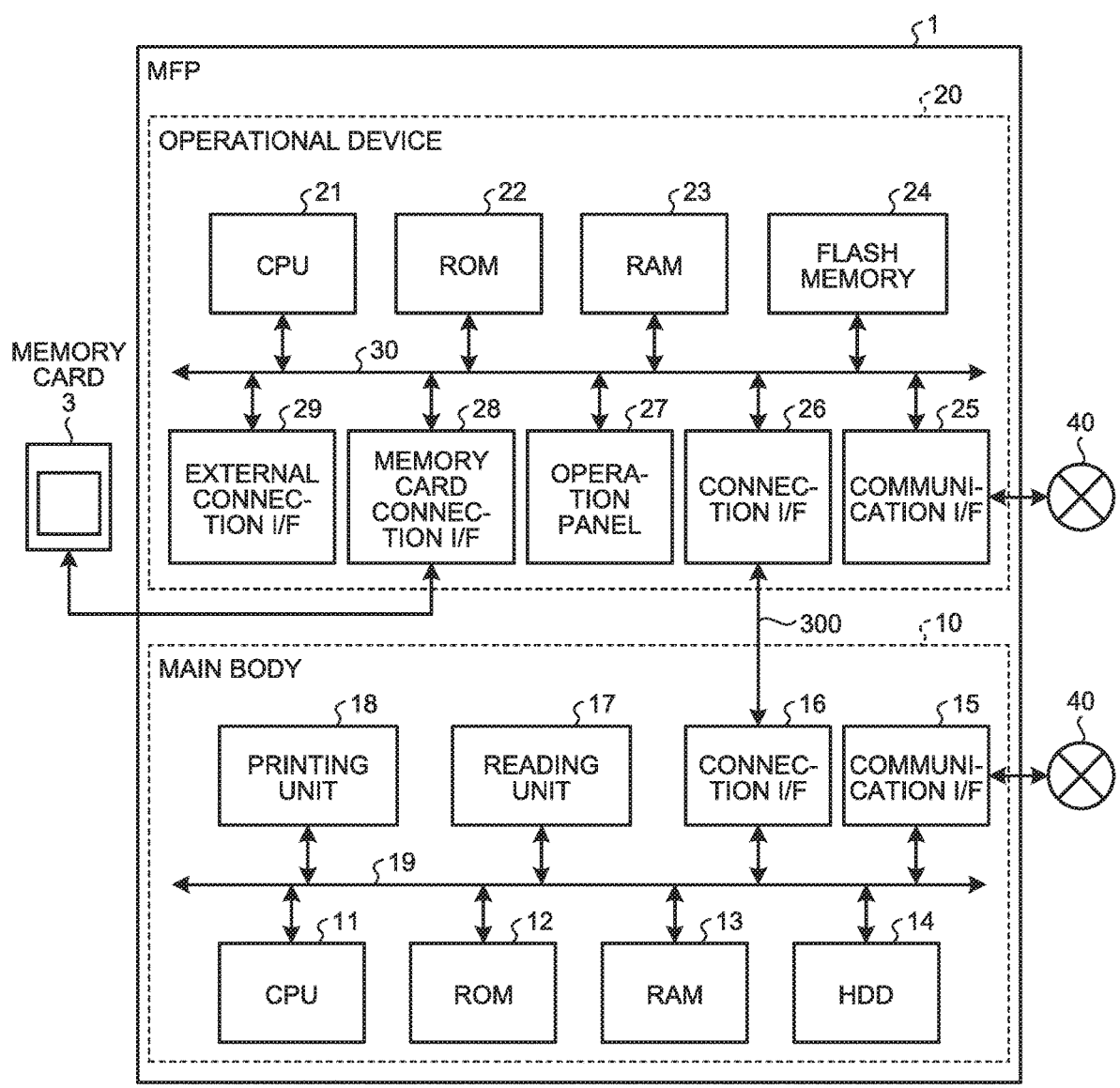
FIG. 2 is a diagram illustrating a hardware configuration of the MFP according to the present embodiment.

FIG. 2 is a diagram illustrating a hardware configuration of the MFP 1 according to the present embodiment. As illustrated in FIG. 2, the main body 10 and the operational device 20 are connected to each other via a communication path 300. The communication path 300 is a wired or wireless communication path. In the following sections, a hardware configuration of the main body 10 will be explained first, before a hardware configuration of the operational device 20 is explained.

As illustrated in FIG. 2, the main body 10 includes a Central Processing Unit (CPU) 11, a Read-Only Memory (ROM) 12, a Random Access Memory (RAM) 13, a Hard Disk Drive (HDD) 14, a communication interface (I/F) 15, a connection I/F 16, a reading unit 17, and a printing unit 18. These elements are connected to one another via a system bus 19.

The CPU 11 controls operations of the main body 10 in an integrated manner. The CPU 11 controls the operations of the entirety of the main body 10 in the integrated manner, by executing a computer program (hereinafter "program") stored in the ROM 12, the HDD 14, or the like, while using the RAM 13 as a work area (a working space).

The communication I/F 15 is an interface for Ethernet (registered trademark), Wi-Fi (registered trademark), or the like, used for connecting to a network 40, which is a Local Area Network (LAN), or the like.

The connection I/F 16 is an interface that communicates with the operational device 20 via the communication path 300 and is compliant with a Universal Serial Bus (USB) standard or the like.

The reading unit 17 is hardware that performs processes to realize the copy function, the scanner function, and the facsimile function. The reading unit 17 includes, for example, a scanner or the like that scans and reads an image of an original document.

The printing unit 18 is hardware that performs processes to realize the printer function. The printing unit 18 includes, for example, a plotter that prints on a medium, or the like. Further, the printing unit 18 may include hardware used for realizing specific options, such as a finisher that sorts out printed media, an Auto Document Feeder (ADF) that automatically feeds an original document, and the like.

Next, a hardware configuration of the operational device 20 will be explained. As illustrated in FIG. 2, the operational device 20 includes a CPU 21, a ROM 22, a RAM 23, a flash memory 24, a communication I/F 25, a connection I/F 26, the operation panel 27, a memory card connection I/F 28, and an external connection I/F 29. These elements are connected to one another via a system bus 30.

The CPU 21 controls operations of the operational device 20 in an integrated manner. The CPU 21 controls the entirety of the operational device 20, by executing a program stored in either the ROM 22 or the flash memory 24, while using the RAM 23 as a work area (a working space).

The communication I/F 25 is an interface that is for connecting to the network 40 and is compliant with a wireless LAN standard or the like.

The connection I/F 26 is an interface that communicates with the main body 10 via the communication path 300 and is compliant with a USB standard or the like.

The operation panel 27 receives various types of inputs corresponding to operations performed by the user and displays various types of information (e.g., a search screen, a setting screen, information about an operating status of the MFP 1, and the like). The operation panel 27 is structured by using, for example, a liquid crystal display device, an organic Electro-Luminescence (EL) display device, or the like that has a touch-panel mechanism installed therein. Further, together with the operation panel 27, one or more hardware keys (buttons), one or more lamps, and the like serving as user interfaces may be provided.

The memory card connection I/F 28 is an interface used for connecting to a memory card 3 configured by using a Secure Digital (SD) card or the like.

The external connection I/F 29 is an interface used for connecting to an Integrated Circuit (IC) card reader or the like.

Figure 3:
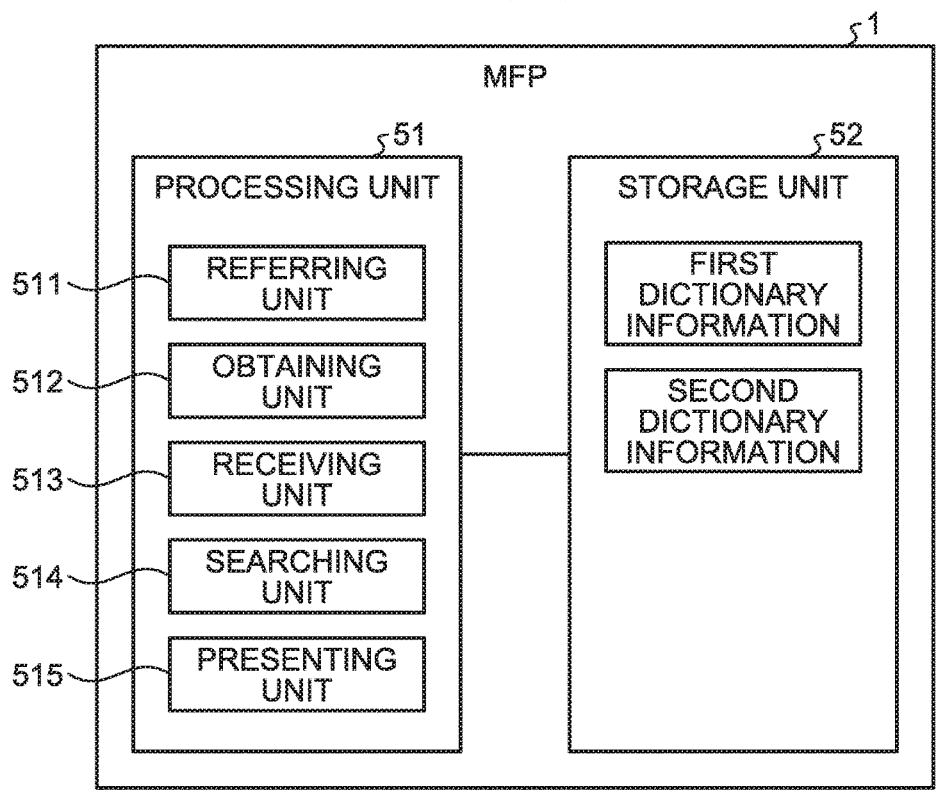
FIG. 3 is a functional diagram of the MFP according to the present embodiment.

FIG. 3 is a functional diagram of the MFP 1 according to the present embodiment. As functional units that are realized as a result of the CPU 21 reading the program into the RAM 23 and executing the program, a processing unit 51 includes a referring unit 511, an obtaining unit 512, a receiving unit 513, a searching unit 514, and a presenting unit 515. Further, a storage unit 52 is realized by the flash memory 24 or the HDD 14, for example, and stores therein first dictionary information, second dictionary information, and the like. For example, the first dictionary information and the second dictionary information are forwarded to and stored into the flash memory 24 or the HDD 14 from the memory card 3 via the memory card connection I/F 28. In this situation, at least one selected from between the first dictionary information and the second dictionary information may be managed in an apparatus (e.g., a server or the like) different from the MFP 1.

Next, the first dictionary information, the second dictionary information, as well as third dictionary information will be explained, with reference to FIGS. 6, 7, and 8. In the following sections, an example will be explained in which the user replaces a multifunction peripheral A (another multifunction peripheral) which he/she has been using and is familiar with, with a new multifunction peripheral (the MFP 1). The multifunction peripherals A and B each have a plurality of setting items that can be configured by the user.

FIG. 6 is a drawing illustrating the first dictionary information according to the present embodiment. The first dictionary information is dictionary information used in the multifunction peripheral A and is also used in the multifunction peripheral B. In association with "facsimile" serving as a standard word (i.e., a standard keyword, which is a keyword contained in the item name of a setting item; the same applies to the second dictionary information and the third dictionary information), the first dictionary information has registered therein "faxing" serving as a relating word (keyword) 1 and "fax" serving as a relating word 2. Further, in association with "binding" serving as a standard word, the first dictionary information has registered therein "fastening" serving as a relating word 1. In this situation, the relating words (the keywords) in the first dictionary information include, for example, at least one selected from between a keyword that partially matches the standard word; and a keyword that is associable with the standard word. (The same applies to the second dictionary information and the third dictionary information.)

FIG. 7 is a drawing illustrating the third dictionary information according to the present embodiment. The third dictionary information is dictionary information initially used in the multifunction peripheral B. In association with "facsimile" serving as a standard word, the third dictionary information has registered therein "faxing" serving as a relating word 1 and "fax" serving as a relating word 2. Further, in association with "staples" serving as a standard word, the third dictionary information has registered therein "stapling" serving as a relating word 1, "staple" serving as a relating word 2, and "stapler" serving as a relating word 3. In this situation, the "binding" and the "staples" are conceptually the same as each other.

When the user who has been using and is familiar with the multifunction peripheral A searches for a setting item while using the multifunction peripheral B having the third dictionary information as described above, the user may inadvertently enter the standard word or any one of the relating words of the multifunction peripheral A. For example, when the user conducts a search on the multifunction peripheral B by entering "binding" or "fastening" as a keyword, the use will not be able to find the desired setting item, because these keywords are not registered in the third dictionary information.

To cope with this situation, the multifunction peripheral B uses the second dictionary information obtained by adding information to the third dictionary information. FIG. 8 is a drawing illustrating the second dictionary information according to the present embodiment. In association with "facsimile" serving as a standard word, the second dictionary information has registered therein "faxing" serving as a relating word 1, "fax" serving as a relating word 2, "facsimile" serving as a standard word of the multifunction peripheral A, and "indirect transmission" serving as a standard word of a multifunction peripheral C. Further, in association with "staples" serving as a standard word, the second dictionary information has registered therein "stapling" serving as a relating word 1, "staple" serving as a relating word 2, "stapler" serving as a relating word 3, "binding" serving as the standard word of the multifunction peripheral A, and "staples" serving as a standard word of the multifunction peripheral C.

In other words, in the second dictionary information serving as the dictionary information of the multifunction peripheral B, the standard words of the other multifunction peripherals (the multifunction peripheral A and the multifunction peripheral C) are associated with one another. As a result, for example, when the user searches for a setting item by entering "binding" or "fastening", the user is able to find the "staples" serving as the standard word of the multifunction peripheral B (details will be explained later).

Returning to the description of FIG. 3, the referring unit 511 refers to the first dictionary information and the second dictionary information stored in the storage unit 52. Alternatively, when the first dictionary information and the second dictionary information are managed (stored) in an apparatus (e.g., a server) different from the MFP 1, the referring unit 511 refers to the first dictionary information and to the second dictionary information stored in the apparatus by accessing the apparatus.

The obtaining unit 512 obtains identification information of another multifunction peripheral (the multifunction peripheral A or the multifunction peripheral C) different from the MFP 1 (the multifunction peripheral B). For example, the obtaining unit 512 obtains the identification information of the other multifunction peripheral, either by receiving the identification information of the other multifunction peripheral from the other multifunction peripheral or on the basis of the identification information of the other multifunction peripheral input by the user.

The receiving unit 513 receives an entered keyword (e.g., "fastening") that is a keyword entered by the user.

The searching unit 514 conducts a search and identifies the standard word (e.g., the "binding") of another electronic device (e.g., the multifunction peripheral A), on the basis of the entered keyword (e.g., the "fastening") and the first dictionary information (FIG. 6) related to the other multifunction peripheral (e.g., the multifunction peripheral A) corresponding to the identification information obtained by the obtaining unit 512. Further, the searching unit 514 conducts a search and identifies the standard word (e.g., "staples") of the MFP 1, on the basis of the identified standard word (e.g., the "binding") of the other multifunction peripheral and the second dictionary information (FIG. 8).

The presenting unit 515 presents the user with a setting item containing the standard word of the MFP 1, on the basis of the standard word (e.g., the "staples") of the MFP 1 identified by the searching unit 514. For example, the presenting unit 515 displays, on the operation panel 27, a list of two or more of the setting items of the MFP 1 containing the standard word of the MFP 1 identified by the searching unit 514 and further presents the user with (displays for the user) a setting screen corresponding to the setting item selected by the user from the list.

In the following sections, as for processes performed by elements other than the functional units 511 to 515 included in the processing unit 51, the subject of the operations will be referred to as the "processing unit 51".

Figure 4:
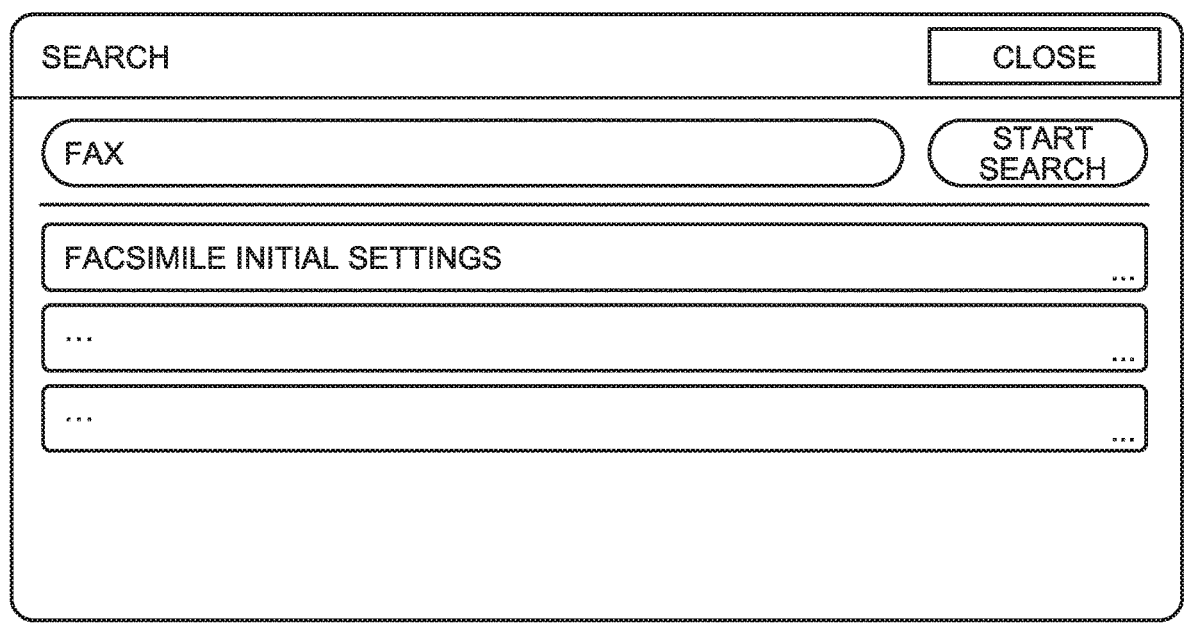
FIG. 4 is a drawing illustrating an example of a first search screen according to the present embodiment.

Next, the search screen will be explained. FIG. 4 is a drawing illustrating an example of a first search screen according to the present embodiment. When configuring a setting into the MFP 1, the user enters a keyword on the search screen to arrange a desired one of the plurality of setting items to be displayed on the operation panel 27. FIG. 4 illustrates an example in which the user had entered "fax" as a keyword and had subsequently pressed the "START SEARCH" button in the upper right part, so that a search result corresponding to the keyword was displayed. After that, when the "facsimile initial setting" button illustrated in FIG. 4 is pressed, a transition is made to the setting screen illustrated in FIG. 5. FIG. 5 is a drawing illustrating an example of the setting screen according to the present embodiment.

Figure 9:
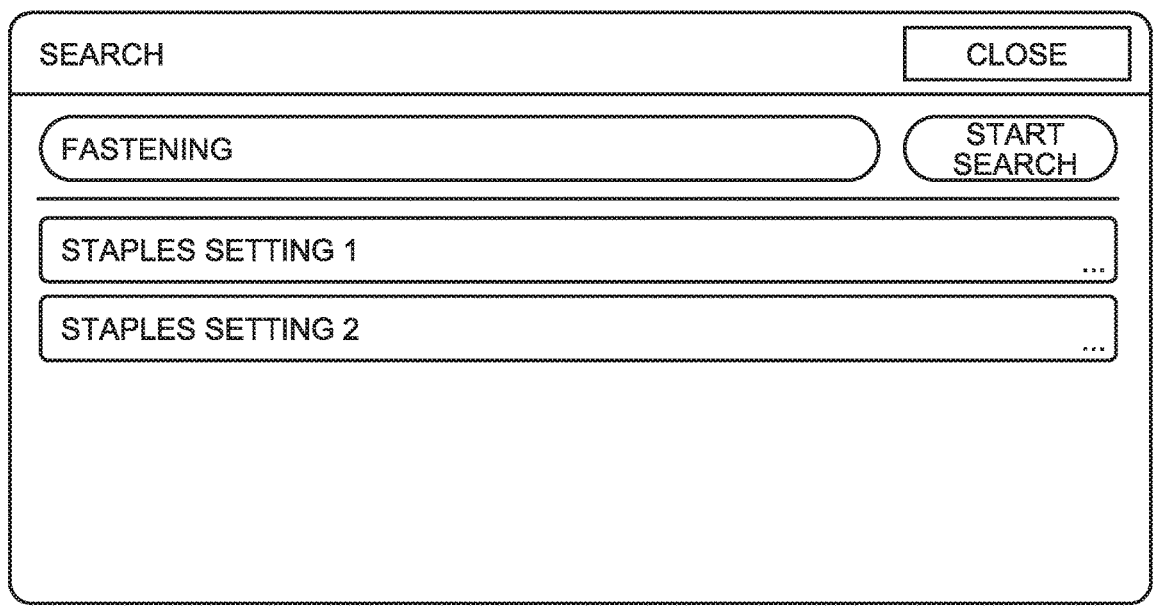
FIG. 9 is a drawing illustrating an example of a second search screen according to the present embodiment.

Further, FIG. 9 is a drawing illustrating an example of a second search screen according to the present embodiment. FIG. 9 illustrates an example in which the user had entered "fastening" as a keyword and had subsequently pressed the "START SEARCH" button in the upper right part, so that a search result ("STAPLES SETTING 1" and "STAPLES SETTING 2") corresponding to the keyword was displayed (details of the process will be explained later). In this situation, pieces of information of "STAPLES SETTING 1" and "STAPLES SETTING 2" are associated with the "staples" serving as the standard word of the MFP 1.

Figure 10:
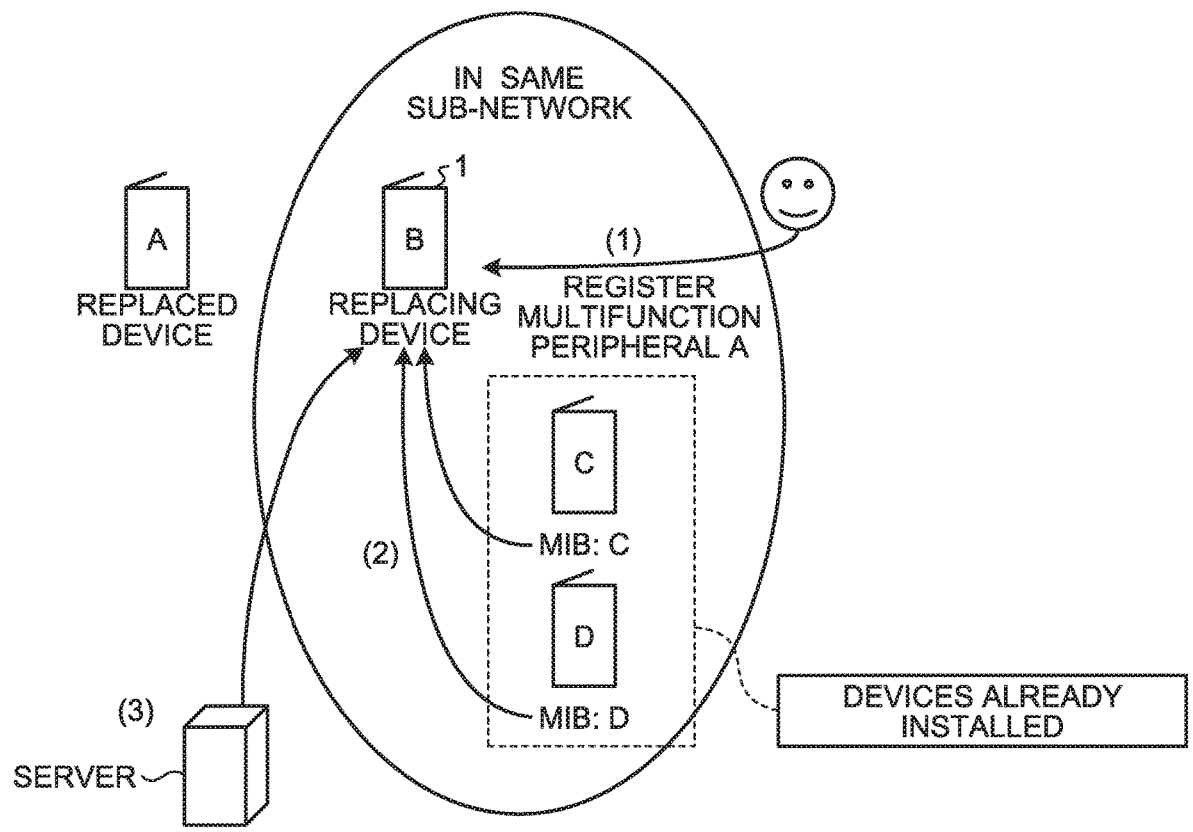
FIG. 10 is a drawing for explaining a data registration process performed when an electronic device is replaced with another according to the present embodiment.

Next, a data registration process performed when a multifunction peripheral is replaced with another multifunction peripheral will be explained. FIG. 10 is a drawing for explaining the data registration process performed when a multifunction peripheral is replaced with another according to the present embodiment. Of the multifunction peripherals in the present example, it is assumed that the multifunction peripheral A is replaced with the multifunction peripheral B (the MFP 1). Further, it is also assumed that the multifunction peripheral C and another multifunction peripheral D have already been installed in the same sub-network.

In that situation, the user registers (the numeral (1) in FIG. 10) the first dictionary information related to the multifunction peripheral A that has so far been used and is to be replaced, into the multifunction peripheral B (the MFP 1), either by using the memory card 3 or by performing an operation on the operation panel 27.

Further, during regularly-performed processes, the multifunction peripheral B (the MFP 1) has registered therein (the numeral (2) in FIG. 10) pieces of model information related to the multifunction peripheral C and the multifunction peripheral D by using Management Information Base (MIB) information. In this situation, when there is a server that collectively manages the multifunction peripheral C, the multifunction peripheral D, and the like, the multifunction peripheral B (the MFP 1) obtains and registers therein (the numeral (3) in FIG. 10) the pieces of model information of the multifunction peripheral C and the multifunction peripheral D stored in the server. Further, the user registers the first dictionary information related to the multifunction peripheral C and the multifunction peripheral D into the multifunction peripheral B (the MFP 1), either by using the memory card 3 or by performing an operation on the operation panel 27. In addition, the user registers the second dictionary information related to the multifunction peripheral B into the multifunction peripheral B (the MFP 1), by using the memory card 3, by performing an operation on the operation panel 27, or by using another mean.

Next, processes including a setting item searching process performed by the MFP 1 will be explained. FIG. 11 is a flowchart illustrating the processes including the setting item searching process performed by the MFP 1 according to the present embodiment. When configuring a setting into the MFP 1, the user enters, via the operation panel 27, the identification information of another multifunction peripheral (e.g., the multifunction peripheral A) that was used before being replaced with the MFP 1. In response, the obtaining unit 512 obtains the identification information of the other multifunction peripheral (e.g., the multifunction peripheral A) different from the MFP 1 (step S1).

In this situation, for example, the user enters a keyword (e.g., "fastening") which he/she previously used when he/she was using the multifunction peripheral A. Accordingly, the receiving unit 513 receives the entered keyword (e.g., "fastening"), which is the keyword entered by the user (step S2).

Subsequently, on the basis of the entered keyword (e.g., "fastening") and the first dictionary information (FIG. 6) related to the other multifunction peripheral (e.g., the multifunction peripheral A) corresponding to the identification information obtained at step S1, the searching unit 514 conducts a search and identifies the standard word (e.g., "binding") of the other electronic device (e.g., the multifunction peripheral A) (step S3).

After that, on the basis of the standard word (e.g., "binding") of the other multifunction peripheral (e.g., the multifunction peripheral A) identified at step S3 and the second dictionary information (FIG. 8), the searching unit 514 conducts a search and identifies the standard word (e.g., "staples") of the MFP 1 (step S4).

Subsequently, on the basis of the standard word (e.g., "staples") of the MFP 1 identified at step S4, the presenting unit 515 presents the user with a setting item containing the standard word of the MFP 1 (FIG. 9) (step S5). For example, the presenting unit 515 displays, on the operation panel 27, a list of two or more of the setting items of the MFP 1 containing the standard word of the MFP 1 identified by the searching unit 514 and further presents the user with (displays for the user) a setting screen corresponding to the setting item selected by the user from the list.

In this manner, according to the present embodiment, it is possible to realize the MFP 1 having improved convenience in relation to the ambiguous searches. More specifically, for example, when the multifunction peripheral A has been replaced with the MFP 1, the user is able to quickly and easily arrange such a screen (FIG. 9) to be displayed that indicates the setting item with the keyword "staples" used by the MFP 1, by entering the keyword "fastening" which he/she previously used when he/she was using the multifunction peripheral A.

In addition, either by using the memory card 3 or performing the operation on the operation panel 27, the user is able to easily register the first dictionary information related to the other multifunction peripheral (e.g., the multifunction peripheral A or the multifunction peripheral C) into the MFP 1. Further, the MFP 1 is able to easily update the second dictionary information by merging (integrating) newly-registered first dictionary information with the second dictionary information. In other words, by using the MFP 1 according to the present embodiment, it is possible to easily customize the second dictionary information by adding the first dictionary information thereto.

Modification Examples

In the embodiment described above, the example is explained in which, when configuring the setting into the MFP 1, the user enters, via the operation panel 27, the identification information of the other multifunction peripheral (e.g., the multifunction peripheral A) that was previously used before being replaced with the MFP 1. Alternatively, another arrangement is also acceptable in which the other multifunction peripheral is identified on the basis of a use history generated as a result of the user using the multifunction peripherals. An example of a use history table managing the use history is presented below. In this situation, an authenticating unit that authenticates the user is provided within the processing unit 51.

TABLE 1

USE HISTORY TABLE

| USER ID | DATE AND TIME OF USE | MODEL |
|---|---|---|
| USER A | 2017/12/01 09:00:00-2017/12/01 09:10:00 | MODEL A |
|  | 2017/12/03 11:00:00-2017/12/03 11:10:00 | MODEL A |
|  | 2017/12/05 13:00:00-2017/12/05 13:10:00 | MODEL B |
|  | 2017/12/07 15:00:00-2017/12/07 15:10:00 | MODEL A |
|  | ... | ... |
| USER B | ... | ... |
| ... | ... | ... |

Under the heading "User Identifier (ID)" are pieces of identification information used for uniquely identifying each user. When a user logs into a multifunction peripheral, the authenticating unit obtains a user ID and a password entered by the user via the operation panel 27 and performs a user authentication process. When the user is successfully authenticated, the authenticating unit transmits the user ID, the date and time of the login, and model information of the multifunction peripheral to a server, for example, so that these pieces of information are registered into the use history table. Any publicly-known technique may be used for the user authentication process. Further, as the identification information used for identifying the user, it is also possible to use a card ID of an IC card, biological information (e.g., a fingerprint) of the user, or the like, in place of the user ID.

In that situation, on the basis of the history information (the use history table) that stores therein the pieces of identification information of the users (the user IDs) and the pieces of identification information of the multifunction peripherals used by the users (information about the models) in association with each other, the obtaining unit 512 (the second obtaining unit) obtains the identification information of the other multifunction peripheral that had previously been used the most by the user, in a predetermined time period before the MFP 1 started being used. Further, the searching unit 514 conducts a search and identifies the standard word of the other multifunction peripheral, on the basis of the entered keyword and the first dictionary information (FIG. 6) related to the other multifunction peripheral corresponding to the identification information obtained by the obtaining unit 512 (the second obtaining unit).

In this situation, "the other multifunction peripheral that had previously been used the most" may be another multifunction peripheral that was used the largest number of times or may be another multifunction peripheral that was used for the longest period of time. Further, the predetermined time period may be, for example, one year prior to a reference date/time at which the MFP 1 is logged into after the replacement.

Alternatively, another arrangement is also acceptable in which, in response to a request from the MFP 1, the server identifies "the other multifunction peripheral that had previously been used the most" on the basis of a use history corresponding to a user ID transmitted thereto and further responds to the MFP 1 with the identified information.

The processing unit 51 included in the MFP 1 stores therein information about the "other multifunction peripheral that had previously been used the most" that was identified, so that when the user instructs that an ambiguous search be conducted, it is possible to identify the word searched for (i.e., the standard word of the MFP 1) on the basis of the first dictionary information and the second dictionary information related to the multifunction peripheral (e.g., the multifunction peripheral A) corresponding to the stored information. With this arrangement, the user is able to conduct the ambiguous search while using the keyword of the other multifunction peripheral that had previously been used much, without the need to enter the identification number of the other multifunction peripheral.

It is possible to realize the functions described in the embodiments and the modification examples, by using one or more processing circuits. In this regard, possible examples of the "processing circuit" in the present disclosure include a processor programmed to execute the functions described above by using software, such as a processor implemented with an electronic circuit; and a device such as an Application Specific Integrated Circuit (ASIC), a Digital Signal Processor (DSP), a Field Programmable Gate Array (FPGA), a conventional circuit module, or the like that is designed to execute the functions described above.

The program executed in any of the embodiments and the modification examples is provided as being recorded on a computer-readable recording medium such as a Compact Disk Read-Only Memory (CD-ROM), a Flexible Disk (FD), a Compact Disk Readable (CD-R), a Digital Versatile Disk (DVD), or the like, in a file that is in an installable or executable format.

Further, it is also possible to store the program executed in any of the embodiments and the modification examples into a computer connected to a network such as the Internet, so that the program can be provided as being downloaded via the network. Further, it is also acceptable to provide or distribute the program executed in any of the devices described in the embodiments and the modification examples, via a network such as the Internet.

Further, it is also acceptable to provide the program according to any of the embodiments and the modification examples by arranging the program to be incorporated in a ROM or the like in advance.

Further, the scope of the present disclosure is not limited to multifunction peripherals such as the MFP 1 described above, but is applicable to all electronic devices in general such as printers (standalone), projectors, electronic blackboards, personal computers, servers, smartphones, and the like.

Further, the unit for displaying the information is not limited to the operation panel 27 described above, but may be a display device to which no operation is input.

According to at least one aspect of the present disclosure, it is possible to achieve an advantage effect where convenience is improved in relation to the ambiguous searches.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An electronic device having a plurality of setting items to be configured by a user, comprising:
a processor configured to perform:
referring to
first dictionary information that is related to another electronic device different from the electronic device and in which a standard keyword that is a keyword contained in an item name of a user configurable setting item of the other electronic device and one or more keywords are associated with one another, and
second dictionary information that is related to the electronic device and in which a standard keyword of a user configurable setting item of the electronic device, one or more keywords, and the standard keyword of the other electronic device are associated with one another;
obtaining identification information of the other electronic device;
receiving an entered keyword that is a keyword entered by the user;
searching including conducting a search to identify the standard keyword of the other electronic device based on the entered keyword and the first dictionary information related to the other electronic device corresponding to the identification information obtained at the obtaining, and conducting a search to identify the standard keyword of the electronic device based on the identified standard keyword of the other electronic device and the second dictionary information; and
presenting the user with a setting item of the electronic device, the setting item containing the standard keyword of the electronic device identified at the searching.

2. The electronic device according to claim 1, wherein the processor is configured to perform, at the obtaining, obtaining the identification information of the other electronic device, either by receiving the identification information of the other electronic device from the other electronic device or based on the identification information of the other electronic device input by the user.

3. The electronic device according to claim 1, wherein the one or more keywords in the first dictionary information include at least one of a keyword that partially matches the standard keyword of the other electronic device and a keyword that is associable with the standard keyword.

4. The electronic device according to claim 1, wherein the processor is configured to perform, at the referring, accessing an apparatus different from the electronic device, to refer to the first dictionary information and the second dictionary information stored in the apparatus.

5. The electronic device according to claim 1, wherein the processor is configured to perform, at the presenting, displaying a list of a plurality of setting items of the electronic device each containing the standard keyword of the electronic device that was identified at the searching and presenting the user with a setting screen corresponding to a setting item selected by the user from the list.

6. The electronic device according to claim 1, wherein the processor is further configured to perform second obtaining the identification information of the other electronic device that has most been used previously by the user in a predetermined time period before the electronic device starts being used, based on history information in which identification information of the user and one or more pieces of identification information of one or more electronic devices that have been used by the user, are associated with one another, and
the processor is configured to perform, at the searching, conducting the search and identifying the standard keyword of the other electronic device, based on the entered keyword and the first dictionary information related to the other electronic device corresponding to the identification information obtained at the second obtaining.

7. The electronic device according to claim 1, wherein the setting item is one of a copy function, a print function, a scan function or a facsimile function.

8. A search method based on (i) first dictionary information that is related to another electronic device different from an electronic device having a plurality of setting items to be configured by a user and in which a standard keyword that is a keyword contained in an item name of a user configurable setting item of the other electronic device and one or more keywords are associated with one another; and (ii) second dictionary information that is related to the electronic device and in which a standard keyword of the electronic device, one or more keywords, and the standard keyword of a user configurable setting item of the other electronic device are associated with one another, the search method comprising:
obtaining identification information of the other electronic device;
receiving an entered keyword that is a keyword entered by the user;
searching including conducting a search to identify the standard keyword of the other electronic device based on the entered keyword and the first dictionary information related to the other electronic device corresponding to the identification information obtained at the obtaining, and conducting a search to identify the standard keyword of the electronic device based on the identified standard keyword of the other electronic device and the second dictionary information; and presenting the user with a setting item of the electronic device containing the standard keyword of the electronic device that was identified at the searching.

9. The search method according to claim 8, comprising, at the obtaining, obtaining the identification information of the other electronic device, either by receiving the identification information of the other electronic device from the other electronic device or based on the identification information of the other electronic device input by the user.

10. The search method according to claim 8, wherein the one or more keywords in the first dictionary information include at least one of a keyword that partially matches the standard keyword of the other electronic device and a keyword that is associable with the standard keyword.

11. The search method according to claim 8, comprising, at the referring, accessing an apparatus different from the electronic device, to refer to the first dictionary information and the second dictionary information stored in the apparatus.

12. The search method according to claim 8, comprising, at the presenting, displaying a list of a plurality of setting items of the electronic device each containing the standard keyword of the electronic device that was identified at the searching and presenting the user with a setting screen corresponding to a setting item selected by the user from the list.

13. The search method according to claim 8, further comprising second obtaining the identification information of the other electronic device that has most been used previously by the user in a predetermined time period before the electronic device starts being used, based on history information in which identification information of the user and one or more pieces of identification information of one or more electronic devices that have been used by the user, are associated with one another, and the search method comprising, at the searching, conducting the search and identifying the standard keyword of the other electronic device, based on the entered keyword and the first dictionary information related to the other electronic device corresponding to the identification information obtained at the second obtaining.

14. A computer program product comprising a non-transitory computer-readable medium including programmed instructions for a computer mounted on an electronic device that has a plurality of setting items to be configured by a user and is capable of referring to (i) first dictionary information that is related to another electronic device different from the electronic device and in which a standard keyword that is a keyword contained in an item name of a user configurable setting item of the other electronic device and one or more keywords are associated with one another; and (ii) second dictionary information that is related to the electronic device and in which a standard keyword of the electronic device, one or more keywords, and the standard keyword of a user configurable setting item of the other electronic device are associated with one another, the programmed instructions causing the computer to execute:

obtaining identification information of the other electronic device;

receiving an entered keyword that is a keyword entered by the user;

searching including conducting a search to identify the standard keyword of the other electronic device based on the entered keyword and the first dictionary information related to the other electronic device corresponding to the identification information obtained at the obtaining and conducting a search to identifying the standard keyword of the electronic device based on the identified standard keyword of the other electronic device and the second dictionary information; and presenting the user with a setting item of the electronic device containing the standard keyword of the electronic device that was identified at the searching.

15. The computer program product according to claim 14, wherein the programmed instructions cause the computer to execute, at the obtaining, obtaining the identification information of the other electronic device, either by receiving the identification information of the other electronic device from the other electronic device or based on the identification information of the other electronic device input by the user.

16. The computer program product according to claim 14, wherein the one or more keywords in the first dictionary information include at least one of a keyword that partially matches the standard keyword of the other electronic device and a keyword that is associable with the standard keyword.

17. The computer program product according to claim 14, wherein the programmed instructions cause the computer to execute, at the referring, accessing an apparatus different from the electronic device, to refer to the first dictionary information and the second dictionary information stored in the apparatus.

18. The computer program product according to claim 14, wherein the programmed instructions cause the computer to execute, at the presenting, displaying a list of a plurality of setting items of the electronic device each containing the standard keyword of the electronic device that was identified at the searching and presenting the user with a setting screen corresponding to a setting item selected by the user from the list.

19. The computer program product according to claim 14, wherein the programmed instructions cause the computer to further execute second obtaining the identification information of the other electronic device that has most been used previously by the user in a predetermined time period before the electronic device starts being used, based on history information in which identification information of the user and one or more pieces of identification information of one or more electronic devices that have been used by the user, are associated with one another, and the programmed instructions cause the computer to execute, at the searching, conducting the search and identifying the standard keyword of the other electronic device, based on the entered keyword and the first dictionary information related to the other electronic device corresponding to the identification information obtained at the second obtaining.

* * * * *